United States Patent [19]

Hanold, III

[11] 3,815,187

[45] June 11, 1974

[54] PROCESS FOR MAKING CERAMIC CAPACITORS

[75] Inventor: R. C. Frederick Hanold, III, Greenville, S.C.

[73] Assignee: Union Carbide Corporation, New York, N.Y.

[22] Filed: July 12, 1972

[21] Appl. No.: 271,032

[52] U.S. Cl.................. 29/25.42, 29/625, 317/258
[51] Int. Cl............................................. H01g 13/00
[58] Field of Search.................. 29/25.42, 625, 604; 317/258, 260, 261; 156/89

[56] References Cited
UNITED STATES PATENTS

| | | | |
|---|---|---|---|
| 3,041,511 | 6/1962 | Peck et al. ...................... | 317/258 X |
| 3,379,943 | 4/1968 | Breedlove........................... | 317/258 |
| 3,446,513 | 9/1969 | Belko, Jr. et al. .................. | 317/258 |
| R26,421 | 7/1968 | Rodriquez et al. ................ | 29/25.42 |

Primary Examiner—Charles W. Lanham
Assistant Examiner—Carl E. Hall
Attorney, Agent, or Firm—Frederick J. McCarthy, Jr.

[57] ABSTRACT

A method for making multilayered ceramic capacitors wherein an ink containing palladium oxide is used in the printing of electrode patterns on green ceramic sheet which is subsequently stacked and sintered.

3 Claims, 3 Drawing Figures

PROCESS FOR MAKING CERAMIC CAPACITORS

The present invention relates to the manufacture of multilayer ceramic capacitors. More particularly the present invention relates to a novel method for providing electrode patterns in multilayer ceramic capacitors.

Multilayer capacitors are regularly used in electronic equipment due to their good volumetric efficiency and suitability for automated assembly. Capacitors of this type and a common method for their manufacture are disclosed in U.S. Pat. No. 3,612,963. In general, multilayer ceramic capacitors can be made by screen printing electrode patterns on a green ceramic sheet in accordance with well known techniques using an electrode forming material, i.e. an ink, containing a finely divided noble metal constituent. The electrode patterns supported in the green ceramic are stacked in a multilayer capacitor configuration, such as described in U.S. Pat. No. 3,612,963, and the capacitor configuration is fired to sinter the green ceramic. Since the manufacture of multilayer ceramic capacitors involves the use of high temperatures, it is important that the electrode forming material employed, i.e. the ink, be such that these temperatures do not adversely affect the ultimate electrical properties of the product capacitor.

It is therefore an object of the present invention to provide a method for making multilayer ceramic capacitors using an electrode forming material which ensures excellent electrical properties in the product capacitor.

Figure 1:
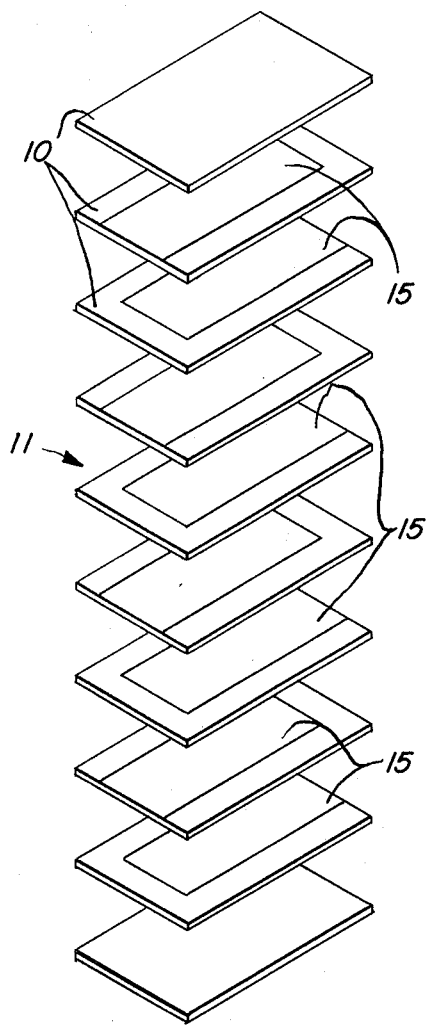
Figure 2:
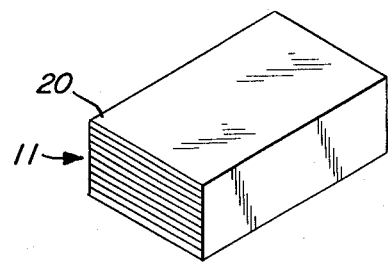
Figure 3:
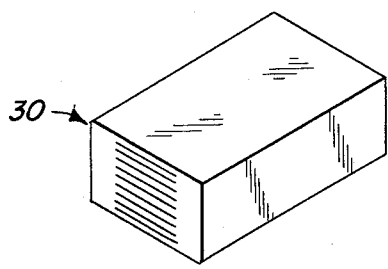

Other objects will be apparent from the following description and claims taken in conjunction with the drawing wherein FIG. 1 shows an unassembled stack of green (unfired) ceramic strips having appropriately arranged electrode patterns and FIG. 2 shows a multilayer capacitor arrangement resulting from the assembly of the ceramic strips of FIG. 1 and FIG. 3 shows a multilayer ceramic capacitor produced by firing the arrangement of FIG. 2.

A method for making multilayered ceramic capacitors in accordance with the present invention comprises the steps of 1. providing a green ceramic sheet
2. printing a plurality of electrode patterns on the green ceramic sheet using an ink consisting essentially of an organic vehicle containing finely divided palladium oxide
3. stacking the ceramic supported printed electrode patterns in a multilayer capacitor configuration and
4. firing the capacitor configuration to sinter the supporting green ceramic.

It has been discovered, as part of the present invention, that by using effective amounts of palladium oxide, PdO, in place of the previously used noble metals, in the manufacture of multilayer ceramic capacitors, in the manner hereinafter described, that significant improvement is obtained in the properties of the product capacitor and additionally, process economics are achieved.

In the practice of the present invention, a conventional green ceramic sheet suitable in the manufacture of multilayer capacitors is provided in a conventional manner, e.g. by slip casting a mix of a finely divided ceramic, such as barium titanate calcium oxide, titanium dioxide, zirconium oxide, and mixtures thereof with resin, solvent and plasticizer. The cast sheet is dried and can be cut into strips, indicated at 10 in FIG. 1, with a pattern of electrodes indicated at 15, being provided on all but the top and bottom strips, by conventional screen printing practice. Additional cover sheets containing no electrode pattern can be used at the top and bottom of the capacitor. Alternately, a pattern of electrodes can be provided on the large sheet before cutting into the desired sized smaller strips. In the present invention, the electrode forming material, i.e. the ink, used in printing of the electrode patterns consists essentially of finely divided palladium oxide in an inert liquid organic vehicle of the type customarily used with noble metal containing inks such as cellulose acetate butyrate, cellulose acetate and other esters of higher alcohols, ethyl cellulose solutions, terpenes, methacrylate esters, and acrylic polymer solutions.

The palladium oxide is conveniently prepared by heating commercially available palladium metal powder in air at temperatures from about 600° C to about 800° C for about 1 to 3 hours. Powders sized from about 0.2 to 2.25 microns having surface areas of 0.1 to 16 m$^2$/gram are suitable for the practice of the present invention. When the palladium has picked up about 50% or more, preferably about 70%, of its stoichiometric weight gain for the formation of PdO, the thus oxidized powder is satisfactory for purposes of the present invention.

The oxidized powder is then mixed with the organic vehicle to provide an ink containing about 40 to 60% by weight Pd, preferably about 50% by weight Pd. The ink is then screen printed on the green ceramic sheet as previously described.

After printing of the electrode patterns, green ceramic strips, as indicated in FIG. 1 at 10 are arranged as illustrated and formed in the capacitor configuration 20 shown in FIG. 2.

The capacitor configuration is then fired to sinter the green ceramic into a polycrystalline mass and convert the PdO in the electrode patterns to palladium metal and provide a multilayer ceramic capacitor indicated at 30 in FIG. 3. Suitable firing temperatures are from 1,050° C to 1,400° C and suitable firing times are from 0.5 to 3 hours.

The multilayer ceramic capacitor thus provided is characterized by improved electrical properties including increased volumetric efficiency and insulation resistance.

Multilayer ceramic capacitors made in accordance with the present invention are not subject to delamination or internal disruption during the firing step which often occurs with the use of metallic palladium containing inks due to oxidation of the metal, with concomitant volume increase. With the use of PdO containing inks, the PdO decomposes to palladium at temperatures above about 800° C without adverse effect.

An important facet of this invention is the preoxidation of the palladium electrode material so that expansion of the electrode caused by oxidation in situ is avoided. Clearly, it is desirable for the degree of preoxidation of the metallic palladium used in the ink manufacture to be sufficient so that a significant increase in degree of oxidation does not occur during the capacitor making operations. As provided above, complete oxidation is not required. The desirable minimum level of oxidation will vary somewhat with the bake-out and firing conditions used in specific capacitor manufacturing operations. In addition, any level of preoxidation with its concomitant reduction in degree of in situ oxidation and expansion is an improvement. However, the full benefits of this invention accrue when a level of preoxidation falling within the composition range $PdO_{0.5}$ to PdO is achieved.

The following example will further illustrate the present invention.

EXAMPLE I

Finely divided powder containing about 90 mol% barium titante balance calcium zirconate (bismuth free i.e. less than 0.1% by weight) sized $<2.0\mu$ was mixed with 10% by weight plasticized polyvinyl alcohol and slip cast and dried to provide green ceramic tape about 1.5 mils thick.

Rectangular electrode patterns (0.520" × 308" × 0.0003") were screen printed on the green ceramic tape as illustrated in FIG. 1 using a 325 mesh (U.S. Series) stainless steel screen. The ink was prepared by heating palladium powder (2–3 microns Fischer Sub-Sieve Size, surface area 2–5 $m^2$/gram) in air at 800° C for about 3 hours to provide about 70% of the stoichiometric weight gain for PdO; the resulting oxidized powder was mixed with an organic vehicle containing about 50% by weight ethyl cellulose dissolved in butyl cellusolve in proportions of 55% of powder to 45% vehicle. This provided a palladium metal content of 50% by weight. The mixture was homogenized by being passed through a 3-roll mill.

The printed green ceramic tape was cut into strips and stacked in a capacitor configuration as shown in FIG. 2. The capacitor configuration was arranged to have 12 printed electrodes, i.e. 11 active dielectric layers and, after firing, horizontal dimensions of 0.44 inch × 0.030 inch. The green ceramic sheet was designed to fire to a 1.0 mil thickness and have a dielectric constant of about 2,000.

The stacked electrode configuration was fired at 1,400° C for 1 hour in air.

The same procedure was followed as above except that the ink contained palladium metal powder (1–3 microns, surface area 2–3 $m^2$/grams).

Comparative tests of the different capacitors showed the following:

| Room Temp. (25°C) Capacitance | PdO capacitor | | Pd Capacitor |
|---|---|---|---|
| %ΔC at −55°C | do. | 4.8% > | do. |
| %ΔC at 125°C | do. | 12.13% < | do. |
| %ΔC at −55°C 50VDC applied | do. | 10.15% < | do. |
| %ΔC at 125°C 50VDC applied | do. | 10.2 % < | do. |
| *IR at 125°C | do. | 6.7 % < | do. |
| Dissipation Factor (all temperatures) | do. | 69.0% > | do. |
|  | do. | = | do. |

Further extensive tests have shown that capacitors made in accordance with the present invention have experienced no delaminations due to oxidation whereas capacitors made using palladium metal ink have an incidence of delamination of 60% or more.

I claim:

1. A method for making multilayered ceramic capacitors having palladium electrodes comprising the steps of
   1. providing a green ceramic sheet
   2. printing a plurality of electrode patterns on the green ceramic sheet using an ink consisting essentially of an organic vehicle containing finely divided oxidized palladium having a composition of $PdO_x$ where $x$ has a value between 0.5 and 1.0
   3. stacking the ceramic supported printed electrode patterns in a multilayer capacitor configuration
   4. firing the capacitor configuration to sinter the supporting green ceramic and to convert the $PdO_x$ to palladium.

2. A method in accordance with claim 1 wherein the oxidized palladium has a composition of about $PdO_{0.7}$.

3. A method in accordance with claim 1 wherein the firing step is conducted at a temperature in the range of about 1,050° C to 1,400° C for about 0.5 to 3.0 hours.

* * * * *